No. 618,414.  
F. B. HARRISON.  
DUST GUARD.  
(Application filed Oct. 29, 1897.)  
(No Model.)

Patented Jan. 31, 1899.

2 Sheets—Sheet 1.

Witnesses—
H. H. Martin
Maud Schumach

Inventor—
Frank B. Harrison
By William Webster
Atty

THE NORRIS PETERS CO., PHOTO-LITHO., WASHINGTON, D. C.

No. 618,414. Patented Jan. 31, 1899.
F. B. HARRISON.
DUST GUARD.
(Application filed Oct. 29, 1897.)
(No Model.) 2 Sheets—Sheet 2.
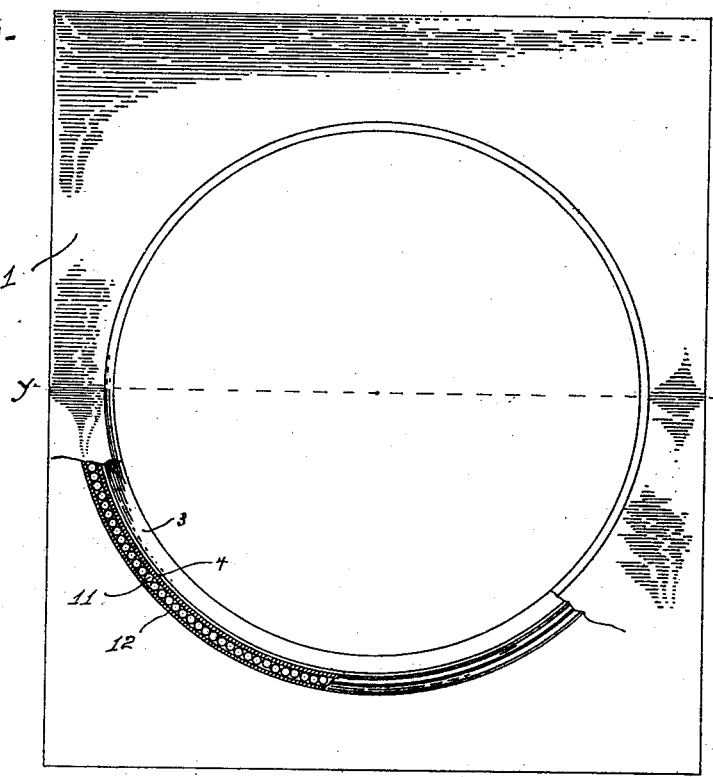
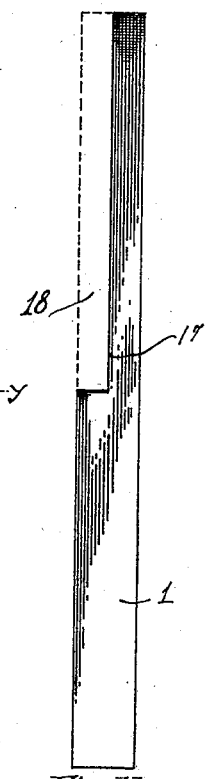
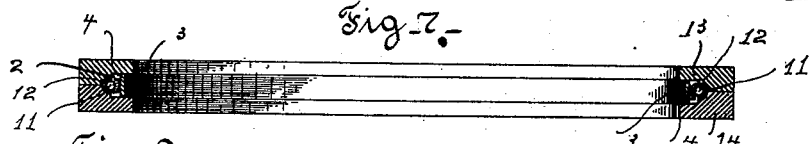
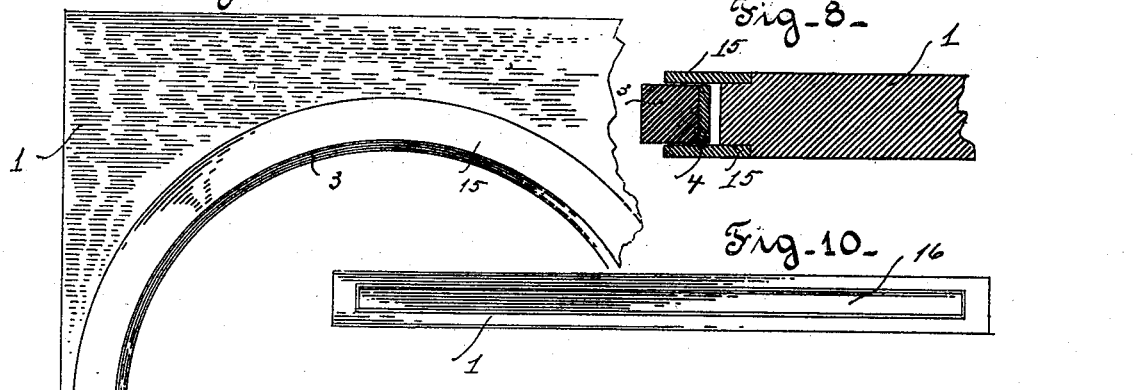
Witnesses—
H. H. Martin
Maud Schumacher.
Inventor—
Frank B. Harrison
By William Webster
atty

United States Patent Office.

FRANK B. HARRISON, OF TOLEDO, OHIO.

DUST-GUARD.

SPECIFICATION forming part of Letters Patent No. 618,414, dated January 31, 1899.

Application filed October 29, 1897. Serial No. 656,797. (No model.)

*To all whom it may concern:*

Be it known that I, FRANK B. HARRISON, of Toledo, county of Lucas, and State of Ohio, have invented certain new and useful Improvements in Dust-Guards for Railway Axle-Journals; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a dust-guard for railway axle-journals, and has for its object to provide a resilient packing-ring which shall yieldingly embrace the axle-journal and be housed within an insertible dust-guard provided with an annular channel in which the packing-ring may revolve.

The essential merits of my invention are an absolute provision against the introduction of dust or gritty matter by reason of the encircling packing-ring and consequent revolution contemporaneously with the revolution of the axle-journal, whereby when the packing-ring is properly housed within the dust-guard the introduction of dust to the journal is avoided, and a further advantage is the economy of construction and durability, with provision for convenience of insertion of the packing-ring.

In considering the matter of convenience of assemblage of the parts it will be apparent that various provisions of construction may be made. I have therefore shown some of the different means that may be employed to render the introduction of the packing-ring convenient, although it will be apparent that this feature is susceptible of various modifications not deemed necessary to be illustrated.

Figure 1:
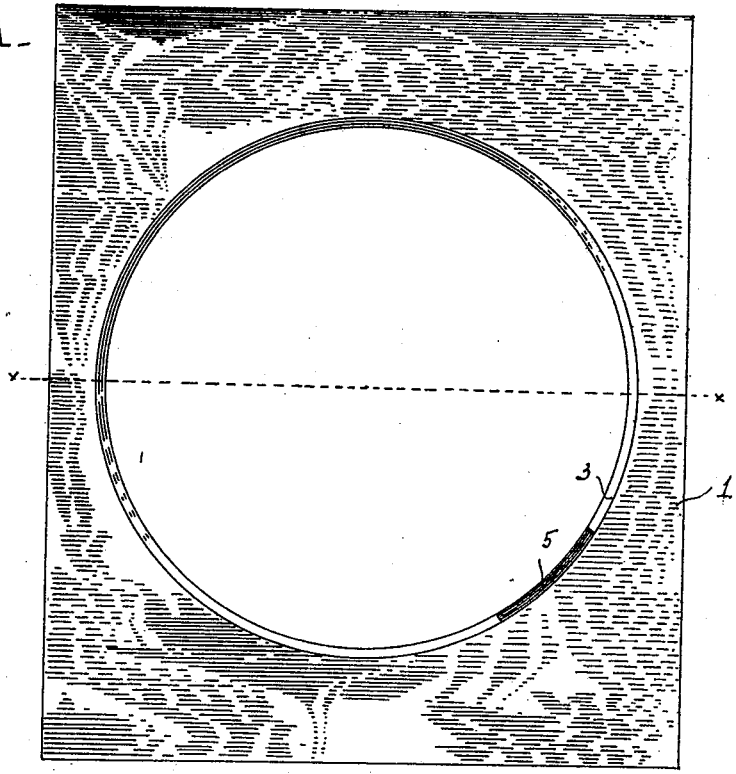
Figure 2:
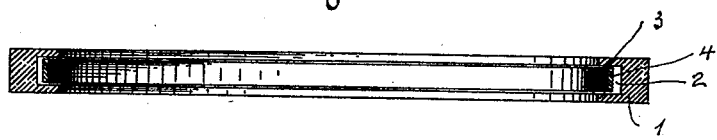
Figure 3:
Figure 4:
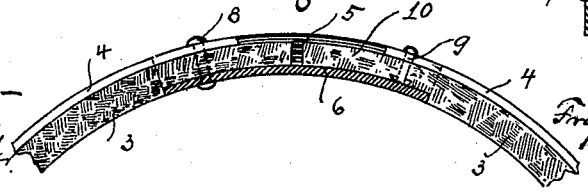
Figure 5:
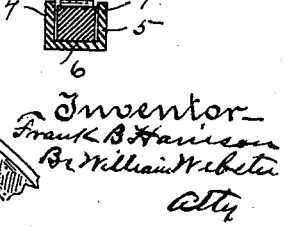

In the drawings, Figure 1 is a side elevation of the dust-guard shown as constructed solidly, with the resilient contractible packing-ring inserted within the annular channel. Fig. 2 is a central transverse section on lines $x$ $x$, Fig. 1, showing the annular channel, packing-ring, and encircling spring in section. Fig. 3 is a top plan view of the packing-ring, showing the keeper, into which one end of the packing-ring and spring are inserted and secured, with the opposite end of the packing-ring slidingly telescoped into the keeper and urged into contraction by the encircling spring secured to the packing-ring. Fig. 4 is a side elevation of the keeper with the side removed to disclose the packing-ring in its telescopic relation therewith, with the contractile spring embracing the packing-ring. Fig. 5 is a view in section, showing the keeper, packing-ring, and spring. Fig. 6 is a side elevation of the dust-guard with a portion broken away to disclose a modified form of channel in which a plurality of antifriction-balls are interposed between the contractile spring and the bottom of the channel to lessen the friction of the revoluble packing-ring and spring. Fig. 7 is a section on lines $y$ $y$, Fig. 6, showing a preferred form of metal channel insertible into the annular channel of the dust-guard as a bearing for the antifriction-balls. Figs. 7, 8, 9, and 10 also show different means for providing for convenience in introducing the packing-ring and spring or in addition the antifriction-balls, if desired. Fig. 8 is a section showing the channel formed by two annular plates or rings secured to the wood of the dust-guard. Fig. 9 is an elevation of the same, showing the plates in side elevation. Fig. 10 is a top view of a portion of the dust-guard, showing a central recess for receiving the packing-ring and spring when inserted from the top; and Fig. 11 is an edge view of the dust-guard, showing a portion of the side removed to allow of introducing the packing-ring and spring, the space being closed by an attachable portion of the dust-guard at one side.

1 designates the dust-guard proper, comprising an angular plate of wood, fiber, or metal, as desired, having an annular channel 2 centrally of the width thereof, in which is housed a packing-ring 3, preferably composed of leather and encircled by contractile spring 4 to closely press the packing-ring upon the journal of the car-axle, it being intended that the packing-ring and spring shall revolve with the axle within the channel of the dust-guard. A preferred form of securing the spring to the packing-ring and to arrange for adjustment of the circumference of the packing-ring is to employ a keeper 5, having a base 6 of the width of the channel and sides at right angles thereto, as at 7, whereby the two ends of the packing-ring 3 are properly housed. At one end of the keeper 5 the spring 4 and packing-ring 3 are secured firmly by a screw or rivet 8, and at the opposite end the packing-ring and spring are secured together by a screw or rivet 9, leaving the ends 10 of the packing-ring free to move within the keeper.

As shown in Figs. 6 and 7, I may supplement the channel by a metal annular bearing-ring 11 and inclose between the spring 4 and the ring 11 a plurality of antifriction-balls 12 to reduce the friction in the revolution of the packing-ring.

In Figs. 1, 2, 3, and 4 I have shown means for compressing the packing-ring within a solid dust-guard frame; but in some instances it is desirable to provide for greater convenience in inserting the ring, and it is especially so in the event of employing the antifriction-balls.

I may construct the dust-guard proper of two halved sections 13 and 14, as shown in Fig. 7, and either dowel, glue, or otherwise secure the sections together, or I may provide an annular recess upon each side of the dust-guard, as shown in Figs. 8 and 9, and employ two annular rings 15 to form the flanges, in which the packing-ring and spring may rest, or, as shown in Fig. 10, I may form an opening 16 in the top of the dust-guard and centrally of the thickness, into which the packing-ring and spring may be inserted, or, as in Fig. 11, I may recess the upper half of the dust-guard, as at 17, to allow of introducing the packing-ring and after the introduction close the side of the dust-guard by a supplemental portion 18, and, in fact, it will be apparent that I may employ various ways and means for rendering the insertion of the packing-ring convenient. I may form the packing-ring of two sections, each section forming a semicircle, and employ two keepers 5 and still be within the spirit of my invention.

It will be apparent that I may manufacture the dust-guard proper of wood, and if necessary of a plurality of laminations put in inverse order of the grain to prevent splitting, or I may form the dust-guard of pulp or indurated fiber, and, in fact, I contemplate forming the rings of indurated fiber or wood-pulp for their compactness and resistance to wear by reason of friction.

A dust-guard constructed in accordance with my invention is practical proof against the introduction of dust or any abrading substance by reason of the fact that the contractile spring closely assembles the packing-ring upon the journal and is so closely housed within the flanges that all tendency to the introduction of dust is avoided.

What I claim is—

1. A dust-guard for car-axle journals comprising a dust-guard frame proper, having a central circular opening, and annular channel in the wall of the opening, a packing-ring located in the channel, a spring encircling the same, whereby the packing-ring is normally compressed, a keeper adapted to embrace and join both ends of the packing-ring, means for securing firmly one of the ends of the packing-ring, the spring and the keeper, whereby the free end of the packing-ring and spring are movably held within the keeper, and means for securing firmly the free end of the packing and spring.

2. In a dust-guard for car-axle journals, a dust-guard proper having an annular channel, a keeper, a packing-ring, an encircling spring secured to one end of the keeper, the encircling spring secured near the opposite end of the packing-ring, a portion of the packing-ring telescoped within the keeper, and a plurality of antifriction-balls housed in the channel and bearing upon the contractile spring.

3. In a dust-guard for car-axle journals, a dust-guard proper provided with a central annular channel formed of one or more supplemental attached portions, and a contractile packing-ring housed within the channel and adapted to revolve with the axle-journal within the channel.

In testimony that I claim the foregoing as my own I hereby affix my signature in presence of two witnesses.

FRANK B. HARRISON.

Witnesses:
 WILLIAM WEBSTER,
 MAUD SCHUMACHER.